UNITED STATES PATENT OFFICE.

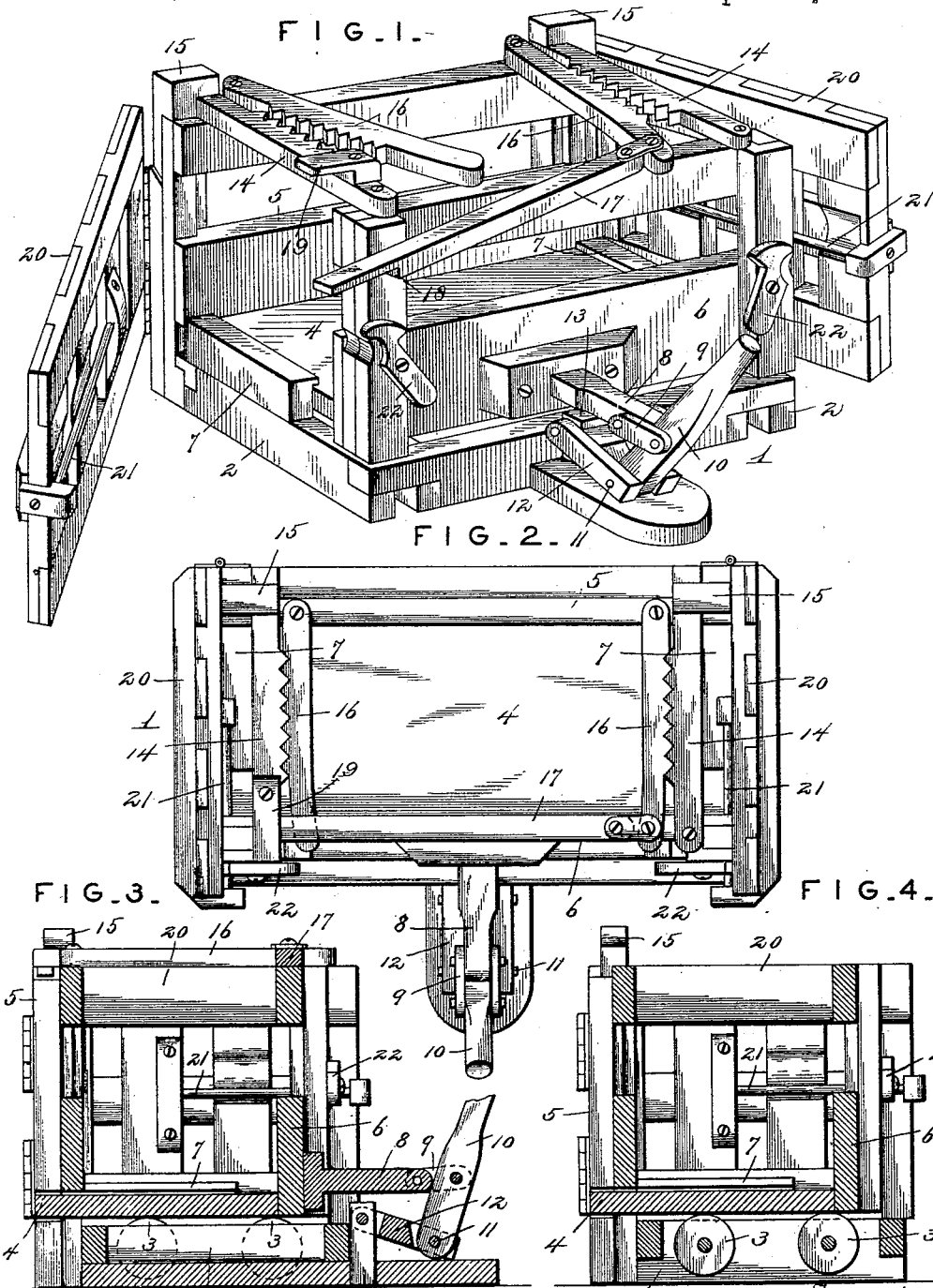

JOE BENNETT, OF COLEMAN, TEXAS.

BRANDING-CHUTE.

SPECIFICATION forming part of Letters Patent No. 602,716, dated April 19, 1898.

Application filed November 16, 1897. Serial No. 658,735. (No model.)

*To all whom it may concern:*

Be it known that I, JOE BENNETT, a citizen of the United States, residing at Coleman, in the county of Coleman and State of Texas, have invented certain new and useful Improvements in Branding-Chutes; and I do hereby declare the following to be a full, clear, and exact description of the invention, such as will enable others skilled in the art to which it appertains to make and use the same.

This invention relates to branding-chutes, and has for its object to provide a simple and novel means for securely holding live stock during the process of branding the same.

The object of the invention is to provide a pen or chute into which the animals may be driven one at a time and which may be contracted or expanded in size so as to fit any animal and at the same time hold the animal securely and prevent it from kicking or writhing and twisting during the act of applying the branding-iron.

The invention also contemplates a novel means for securely retaining and locking the parts of the pen or chute when adjusted to the proper position.

The detailed objects and advantages of the invention will be pointed out in the course of the subjoined description.

My invention consists in certain novel features and details of construction and arrangement of parts, as hereinafter fully described, illustrated in the drawings, and incorporated in the claims.

In the accompanying drawings, Figure 1 is a perspective view of a branding-chute constructed in accordance with this invention, showing the locking devices thrown out of engagement, so that the size of the chute may be adjusted. Fig. 2 is a plan view of the same, showing the parts in their locked position. Fig. 3 is a vertical cross-section through the chute, taken in line with the operating-lever. Fig. 4 is a similar view taken in line with the roller.

Similar numerals of reference designate corresponding parts in all the figures on the drawings.

The improved branding-chute contemplated in this invention embodies, essentially, a base-frame 1, consisting of parallel and transverse beams, the said frame embodying at each end parallel transverse timbers 2, between which are journaled a series of rollers 3, upon which the transversely-movable floor is mounted.

The chute or pen comprises one stationary upright side 5, extending longitudinally of the pen and preferably formed of stout slats or bars. The remaining side 6 of the chute is similarly constructed, but is made to move toward and away from the stationary side, and also carries with it the movable floor 4, the latter being secured rigidly to the side 6 and moving through a corresponding opening in the side 5, just above the base 1, and being actuated by means of end cleats 7. Extending laterally from the side 6 is an arm 8, connected by means of one or more links 9 with an operating-lever 10, the lower end of which is pivotally connected at 11 to the swinging fork 12, pivotally connected at its inner end to a short post 13.

From the above it will be seen that by rocking the lever 10 the flooring 4 and side 6 of the chute will be moved in a corresponding direction and that it will operate easily, even under the weight of a heavy animal, by means of the flooring being mounted upon the rollers 3. It will also be seen that the adjustment may be effected without danger to the operator, who stands at a safe distance from the animal.

Secured to the top of the side 6, at the opposite ends thereof, are two toothed bars 14, having their teeth disposed inwardly toward each other. Each of the bars 14 is secured at one end to the side 6 and slides at its opposite end across the top of the side 5 and beneath L-shaped guides or keepers 15 on the side 5. Connected pivotally to the side 5 are two other bars 16, which lie in the same horizontal plane with the bars 14 and are slid across the top edge of the movable side 6. The teeth of the bars 16 are arranged opposite the teeth of the bars 14 and are adapted to intermesh therewith. Connected pivotally to one of the bars 16 is a spreading bar 17, the same being recessed at its opposite end to form a shoulder 18, designed to engage with the free end of the other bar 16 for holding both bars 16 in engagement with the bars 14. The extreme end of the bar 17 is adapted to move beneath and into engagement with an L-shaped keeper 19, fastened to the upper surface of one of the bars 14. When the bars 14, 16, and 17 are in the position indicated, it will be seen that the movable side 6 is held locked against any movement whatever, and it will also be apparent that the animal may thus be held securely and prevented from writhing and twisting during the operation of branding.

At each end of the chute or pen is a door 20, hinged at one end to the stationary side and provided upon its inner side with a horizontal keeper-rod 21, adapted to be engaged at any point by a pivoted button or hook 22, mounted on the movable side of the chute.

From the foregoing description it will be seen that by opening one of the end doors an animal may be driven into the pen, after which the door is closed. The operator now moves the lever 10 until the movable side 6 is forced against the animal with the required pressure, thus confining the animal between the sides 5 and 6. The pivoted bars 16 are now rocked into engagement with the slide-bars 14 and secured by means of the bar 17 in the manner above described. This operation may be performed very quickly, and when completed the animal is held ready for branding. When the branding operation is completed, the side 6 is drawn outward after unlocking the same and the door at the opposite end of the pen is thrown open, thus allowing the animal to escape.

Having thus described my invention, what I claim as new, and desire to secure by Letters Patent, is—

1. In a branding-chute, in combination, a suitable base, a stationary side, a movable side, means for shifting the movable side toward and away from the stationary side, two slide-bars attached to the movable side, two bars pivotally connected to the stationary side and arranged to intermesh with the two side bars, and a spreading bar for holding the pivoted bars in engagement with the slide-bars, substantially as described.

2. In a branding-chute, in combination, a base, a stationary side connected thereto, a movable side, a movable floor connected to the movable side, an operating-lever for shifting the movable side and floor, and toothed interlocking bars for holding the movable side and floor fixed, substantially as described.

3. In a branding-chute, in combination, a base, a stationary side, a movable side, means for shifting the movable side, a pivoted catch or button on the movable side, an end gate hinged to the stationary side and a keeper-rod extending along the inner side of the gate and designed to remain in engagement with the catch during the shifting of the movable side, substantially as described.

In testimony whereof I affix my signature in presence of two witnesses.

JOE BENNETT.

Witnesses:
W. T. KNOX,
C. A. HEMPHILL.